United States Patent [19]
Fukuda et al.

[11] 3,868,593
[45] Feb. 25, 1975

[54] HOLLOW-CATHODE LASER TUBE

[75] Inventors: Shuichi Fukuda; Masao Miya, both of Tokyo, Japan

[73] Assignee: Nippon Electric Company, Limited, Tokyo, Japan

[22] Filed: Oct. 12, 1973

[21] Appl. No.: 406,095

[30] Foreign Application Priority Data
Oct. 17, 1972  Japan.............................. 47-104152
Dec. 5, 1972   Japan.............................. 47-122234

[52] U.S. Cl........ 331/94.5 D, 330/4.3, 331/94.5 PE
[51] Int. Cl............................................. H01s 3/02
[58] Field of Search........................ 331/94.5; 30/4.3

[56] References Cited
UNITED STATES PATENTS
3,460,053  8/1969  Leonard............................. 331/94.5
3,582,817  6/1971  Gilson................................ 331/94.5
3,713,043  1/1973  Avivi.................................. 331/94.5

Primary Examiner—William L. Sikes
Attorney, Agent, or Firm—Sandoe, Hopgood & Calimafde

[57] ABSTRACT

A hollow-cathode metal vapor laser tube is disclosed in which a hollow cathode is composed of a plurality of tubular cathode members aligned along a common axis and axially spaced from one another. The anode is composed of a plurality of tubular anode members interposed between adjacent cathode members and surrounding the cathode members. The several cathode member - anode member combinations are electrically insulated to permit the separate application of excitation power thereto.

4 Claims, 5 Drawing Figures

HOLLOW-CATHODE LASER TUBE

This invention relates generally to lasers, and more specifically to a hollow-cathode metal vapor discharge tube for laser oscillation.

Metal vapor laser tubes may be classified into two categories. Those in one group utilize the positive column of an electric discharge, whereas those in the other group utilize the negative glow. The so-called hollow-cathode laser tube falls in the latter category.

There are two different types of laser tubes of the hollow-cathode configuration. In one, a slender cylindrical metal tube having a plurality of axial through holes is used as the hollow cathode and rod-like anodes are disposed opposite to these holes. The other type, designated as the slotted hollow-cathode configuration, has two cylindrical metal tubes of different diameters forming the electrodes of the laser structure. In this type of tube, a cathode tube having a slot along its full length is placed within the anode with their central axes being maintained coincident or in parallel. Both hollow-cathode configurations are suited for providing a discharge pass transverse to the cathode axis.

A normal gas discharge in the described electrode configurations exhibits the typical visible characteristics of the conventional hollow-cathode discharge, i.e., the familiar negative glow region restricted to the inside of the cathode. The light from this glow region originates from atoms and ions of the carrier gas and sputtered cathode material. These particles are excited in the hollow cathode by a variety of collision processes. If metal vapor is diffused into the hollow cathode, however, the metal will also be collisionally excited to emit light rays depending upon its characteristic spectrum.

Laser tubes having the design features mentioned above, however, tend to lack the uniformity in metal vapor pressure, current density, and temperature over the entire cathode length. This is a result of the use of the single-piece cathode whose surface condition tends to vary with time after being subjected to long-lasting electron emission. This variation in the cathode adversely affects the output stability and the laser oscillation efficiency of the tube, which limits the application of these tubes to practical use.

Furthermore, conventional hollow-cathode laser tubes all have short, useful lives, primarily as a result of one or more of the following factors:

1. The metal, after being vaporized to form the lasing medium, tends to be diffused toward the exterior of the anode, the glass tube walls, and the Brewster windows which results in its disappearance from the discharge space;
2. The metal particles are evaporated onto the Brewster windows, thereby to increase the loss of the optical resonator and discontinue the laser oscillation;
3. As the temperature within the laser tube is lowered after the laser operation is discontinued, the metal vapors within the tube adhere onto the insulating material forming a conductive film which tends to form a short-circuit between the anode and the cathode; and
4. In some occasions, the discharge occurs between the external cathode wall and the anode. Under such state, no discharge occurs from the internal cathode surface.

It is an object of this invention to provide a hollow-cathode laser tube capable of providing a stabilized output level.

It is another object of this invention to provide a hollow-cathode laser tube which is long in life and adapted to practical use.

In the laser tube of this invention, a plurality of tubular cathode sections of comparatively short axial length are stacked with their axes aligned. In contrast to the conventional apertured or slotted tubular cathodes, the cathode sections contain neither holes nor slots. The cathode sections are disposed at equal intervals within the anode, which is also of tubular form, so as to be co-axial with the cathode sections. Negative voltages are applied to the cathode sections, which may be adjusted before operation to achieve the highest stability and optimized output level.

Negative voltages of relatively smaller absolute values are applied to those cathode sections exhibiting a favorable discharge state, and negative voltage of larger absolute values are applied to those cathode sections exhibiting an unfavorable discharge state so as to achieve uniform discharge states, thereby to maintain an optimum discharge state for a sufficiently long period of time.

Furthermore, since each cathode section has neither holes nor slots, the discharge occurs in a direction substantially parallel to the tube axis, thereby maintaining a uniform negative glow along the entire length of the tube axis. Thus, a stabilized laser output can be reliably maintained.

The hollow-cathode tube of this invention provides the following features and advantages. First, the contamination of the Brewster windows by the evaporation of metal is prevented. This is because a tubular anode structure serves as an evacuated envelope in lieu of a conventional glass envelope and, at the same time, an auxiliary anode is installed adjacent to each Brewster window section to prevent the diffusion of metal vapor into the discharge space.

Secondly, the external surface of each tubular cathode section is covered with an insulating material and the assembly is held within the anode structure. The possibility of short-circuiting between the anode and the cathode is thus eliminated.

Thirdly, the anode structure is divided into sections. This construction considerably enhances the mechanical precision for the assembly work of bringing the tube axis of each cathode section into coaxial alignment with that of the anode structure, and also facilitates the voltage application to the cathode sections.

To the accomplishment of the above and to such further objects as may hereinafter appear, the present invention relates to a hollow-cathode laser tube substantially as defined in the appended claims, and as described in the following specification taken together with the accompanying drawings in which:

Figure 1:
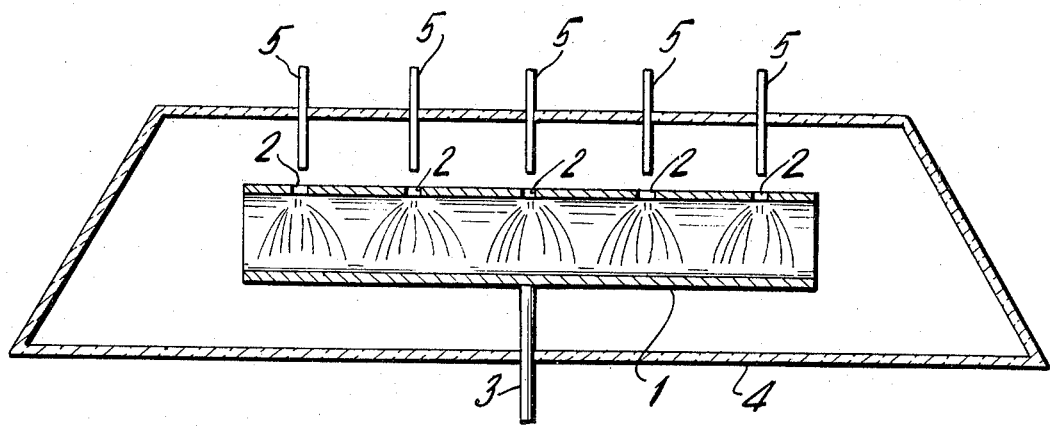
FIG. 1 is a schematic cross-sectional view of a conventional hollow-cathode laser tube.

Referring now to the conventional hollow-cathode laser tube shown in FIG. 1, holes 2 of suitable diameter are provided in the wall of a hollow cathode 1 (one example of a hollow cathode in actual use is approximately 6mm in inner diameter and from 40 to 80cm in length). The hollow cathode 1 is supported by a cathode supporting rod 3 sealed in a glass envelope 4.

Anodes 5 are installed at positions corresponding to these holes and an electric discharge occurs between the inside of the hollow cathode and each anode 5. As illustrated, each discharge path is from the interior wall of the hollow cathode to each anode 5 via the corresponding holes 2. In the hollow-cathode discharge metal vapor laser tubes of this type, the hollow cathode is composed of a single-piece metallic tube.

This configuration makes it difficult to form a negative glow of uniform intensity within the hollow cathode 1, because the cathode 1 is equipotential over its entire length, and, thus, the electron emission tends to occur at some favorable position of the interior surface of the cathode 1 as a result of surface condition. Another problem arises from the fact that the position of the electron emission changes from one place to another with time to make the discharge extremely unstable and the performance of the laser tube unsatisfactory.

Figure 2:
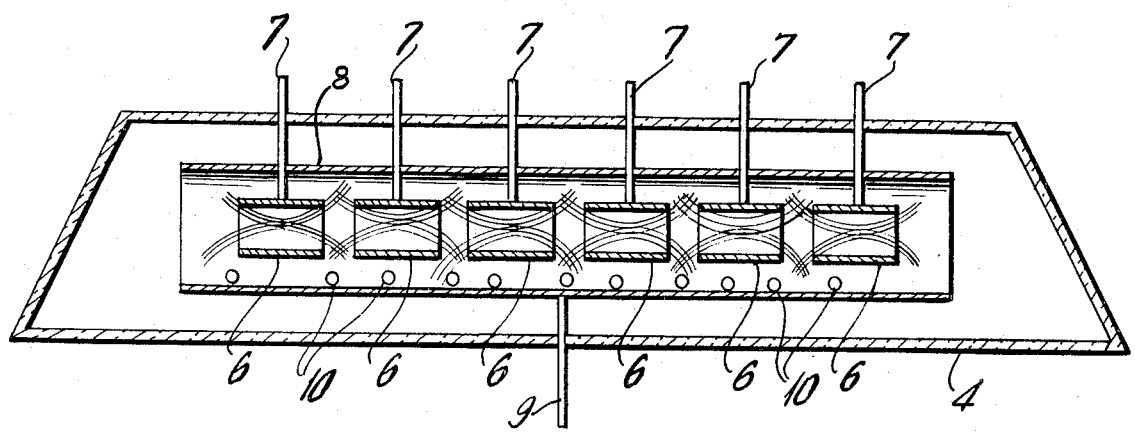
FIG. 2 is a schematic diagram illustrating the principle of operation of the hollow-cathode laser tube of this invention.

Referring to the embodiment of the invention illustrated in FIG. 2, the hollow cathode is in the form of a plurality of sectionalized hollow cathode sections 6 arranged on a common axis and spaced at equal intervals. The length of each hollow cathode section is advantageously approximately 10 times as great as its inner diameter, and each hollow cathode section is supported in position with a surface-insulated metallic cathode rod 7 fixed by the glass envelope 4.

A tubular anode 8 is disposed coaxially with each hollow cathode section outwardly and is supported with an anode rod 9 which is fixed to the glass envelope 4. Pieces of metal 10 to be vaporized are disposed within anode 8 to form the laser-active medium upon evaporation. Helium gas is sealed as a carrier gas in the glass envelope 4. When a voltage is applied between the anode rod 9 and the cathode rods 7 to cause a gaseous discharge, the metal pieces 10 begin to evaporate to build up the metallic vapor pressure.

The length of each hollow cathode section is only about 1/10 to 1/20 of the length of a conventional single-piece cathode and voltages of different magnitudes can be applied to the individual hollow cathode sections through their individual cathode rods 7. All hollow cathode sections 6 are thus furnished with discharge voltages sufficient for the discharge and uniform negative glow sections can be formed as a whole.

With this cathode structure, the negative glow discharge path is developed between the interior wall of each hollow cathode section or each hollow cathode section end and the interior wall of the anode 8 in the vicinity of the cathode end. Therefore, the negative glow, which is effective for laser oscillation, takes place in the axial direction of each hollow cathode section 6.

As compared with a conventional metal vapor laser design that employs a transverse-discharge configuration, the negative glow sections in the hollow cathode sections of the tube structure shown in FIG. 2 are much more uniform and efficient with much more stabilized output. An embodiment of this invention is now described in detail with reference to FIG. 3, 4, and 5.

Figure 3:
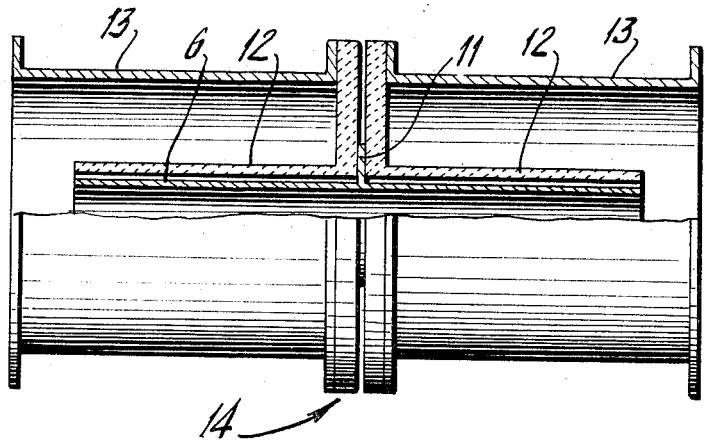
FIG. 3 is a partial cross-sectional diagram of the cathode-anode assembly sections for use in hollow-cathode laser tube according to an embodiment of this invention.

Referring to FIG. 3, which shows a partial cross-sectional view of the central portion of the flanged, cathode-anode assembly sections of a hollow-cathode laser tube according to this invention, two ceramic tubes 12, each provided with a flange of large diameter (30mm) are arranged back-to-back. A tubular hollow cathode section 6, which may be made of Kovar and be 5cm in length and 4.2mm in inner diameter, is fitted into the ceramic tubes. Cathode section 6 is provided with a projecting collar 11 for electrode lead connection.

The surface of the flanges of the ceramic tubes, which come in contact with the collar 11 of the hollow cathode section, are metallized and a hermetic sealing bond is formed with the collar by soldering. The central cathode-anode assembly sections 14, which may be 6.05cm in total length, can be fabricated by arranging two both-end flanged anode tube sections 13 made of Kovar, which may each be 2.5cm in length and 24mm in inner diameter, coaxially with the cathode tube sections 6 and soldering and sealing the flange surfaces to the flange surfaces of the ceramic tubes 12. It will be seen that in this metal-cathode-anode assembly 14, the anode 13 and the cathode section 6 are prefectly electrically insulated from each other.

Figure 4:
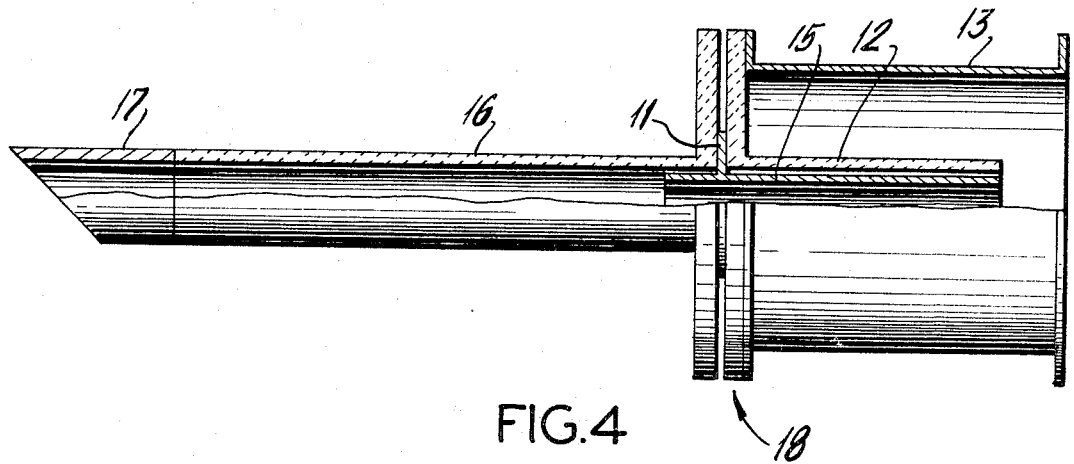
FIG. 4 is a partial cross-sectional diagram of the cathode-anode assembly end section for use in a hollow-cathode laser tube according to an embodiment of this invention.

Referring to FIG. 4, which illustrates in partial cross-section the cathode-anode assembly section at each end of a laser tube according to this invention, it is seen that the two flanges ceramic tubes 12 and 16 are brought close enough so that the two flanges sandwich the collar of the hollow cathode section 15, which may be 3cm in length and 4.2mm in inner diameter, to which an electrode lead is to be connected. Those flange surfaces of the tubular ceramic sections, which are in direct contact with the collar 11, are metallized for ease of soldering as mentioned previously.

Each tubular anode section 13 is brought into coaxial alignment with the tubular cathode section 15 and is soldered to the flange of the ceramic tube section 12. The tip end surface of the long ceramic tube section 16 is also metallized for soldering thereto one end of a metallic auxiliary anode section 17 of tubular form, the other end of which is cut at a Brewster angle. The end portion 18 of the cathode-anode assembly is fabricated so as to maintain a sufficient dielectric strength between the cathode 15 and the anode 13.

Figure 5:
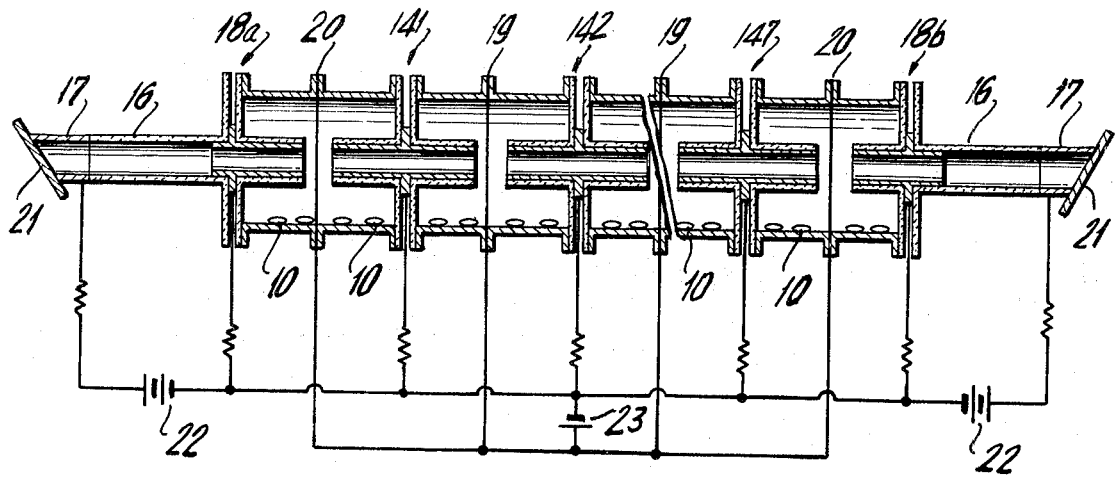
FIG. 5 is a cross-sectional view of a hollow-cathode laser tube according to an embodiment of this invention.

FIG. 5 illustrates a metal-ceramic laser tube fabricated with seven cathode-anode assembly sections as illustrated in FIG. 3 and two cathode-anode assembly end sections 18 as illustrated in FIG. 4.

As the first step of the fabrication process, the seven cathode-anode assembly sections 14, 141 through 147 are attached together one by one so that their central axes are aligned. Then the seam portions 19 are welded together by a helium arc welding method. The cathode-anode assembly end sections 18a and 18b are then connected at the location 20 to both ends of the above-mentioned cathode-anode sub-assembly coaxially therewith by a helium arc welding method.

Pieces of cadmium metal, which are to become an active medium, are then introduced from each auxiliary anode end opening so that the cadmium is arranged in equal amounts on the interior wall of each anode section. This is followed by hermetically sealing a Brewster window 21 to each end of the assembly, evacuating the tube, and introducing helium as a carrier gas within the tube.

The effective cathode length for a metal vapor laser tube fabricated according to this invention are illustrated in FIG. 5, was found to be 41cm and independent voltages could be applied with ease, because the anode structure is also divided into sections. A negative voltage was applied to each cathode section through a 2.1-KΩ resistor, whereas all anode sections are maintained at the same voltge. A positive voltage of an auxiliary power supply 22 is applied to the auxiliary anode, and the opposite electrode of the auxiliary power supply is connected to the negative electrode of a main power supply 23.

By way of example, for a case where the helium gas pressure is maintained at 12 Torr, the distance between the two mirrors constituting the optical resonator is 90cm to achieve laser oscillation.

In order to prevent the Brewster windows from contaminating, currents of 30mA are conducted in the two auxiliary anodes 17, whereby a positive column is produced in each ceramic tube 16. A discharge current of approximately 1 ampere is then conducted in all cathode sections from the main power supply.

As soon as the cadmium begins to evaporate by heat as a result of the discharge, the discharge current of each cathode section begins to decrease and the laser tube terminal voltage begins to increase. In about 30 minutes, the discharge current and the terminal voltage settle to constant values at about 880 milliamperes and 370 voltages, respectively. In this case, the anode surface temperature was constant at 252°C and the laser output was also constant at 58 milliwatts (wavelength 4416A).

Extensive experimentation with similar hollow cathode laser tubes of different helium gas pressures and mirror distances has demonstrated that laser oscillations at a number of wavelengths could be sustained with sufficient stability, such as 8878A, 8531A, 8067A, 7284A, 7237A, 6360A, 5378A, 5337A, and so forth.

Since the positive column is formed within each long ceramic tube 16, the ceramic tube wall temperature can be held sufficiently high. Thus the metal vapors do not condense on the interior wall of the ceramic tube 16. With the diameter and the length of the long ceramic tube 16 made comparatively small and long, respectively, the metal vapors being diffused from the cathode end are positively ionized in the positive column and are caused to drift back toward the hollow cathode by the phenomenon known as the cataphoresis flow, thereby preventing the diffusion of the metal vapors from the hollow cathode end and the resultant contamination of each Brewster window. Therefore, the metal vapors as laser active material can be used repeatedly and a laser tube of sufficiently long-life and practical utility is achieved by the laser tube of this invention.

In contrast, the cathode or the anode of a conventional hollow cathode laser tube does not take a sufficient hermetically sealed structure for metal vapors. Thus, the metal vapors released from the discharge space in the conventional laser tube would adhere onto the interior surface of an enclosure such as the glass walls, resulting in a marked decrease in the metal vapor density within the cathode space. When the gaseous discharge is turned off, the temperature within the tube begins to decrease and the metal vapors begin to deposit on various wall surfaces.

In the laser tube of the invention, since the external walls of the cathode sections are completely covered with the ceramic tubes and the decrease of temperature near the cathode sections is the smallest, there is no possibility of the adherence of the metal vapors in amounts that would cause short-circuiting and the cessation of the discharge as in conventional laser tubes.

In contrast with the cathode of a conventional laser tube, the hollow cathode of this invention is sectionalized which enables different voltages to be applied to the individual cathode sections. Since the voltage is applied to each cathode section through a resistor, the voltage drops between any two cathode-anode sections vary from each other, the degree of the variations depending on the electron emission state.

In cases in which the electron emission state is unfavorable, the discharge current from any cathode decreases and the voltage drop across the resistor also decreases. Consequently, the interelectrode voltage increases to improve the electron emission state and the discharge current increases. Thus, a stabilized self-recovery state is created in each cathode section. All hollow cathode sections are thus filled with metal vapors of uniform density and the negative glow region becomes uniform. Therefore, a hollow cathode laser tube of stabilized operation and high efficiency can be realized.

With the conventional laser tube structure, the metal vapor density is not uniform along the cathode, which results in the non-uniformity in the discharge. It has thus been difficult to obtain metal vapors suitable for laser oscillation along the entire length of the laser tube.

As will be apparent from the foregoing description, a novel laser discharge tube is provided according to this invention, in which each cathode section, each insulating ceramic tube, and each anode section can be prepared of high mechanical precision and exact dimensions. The thermal capacities of all cathode-anode assembly sections thus become the same.

Furthermore, the division of the hollow cathode structure into sections to maintain a uniform discharge state has made is possible to realize a hollow-cathode laser tube of stabilized operation, long-life, high efficiency, and high mechanical shock-resistant property.

The present invention is applicable to a metal vapor laser tube which contains vapor of either cadmium, zinc, selenium, tellurium, cesium, tin, manganese, or mercury as the laser active material. While the long tube 16 is made of a ceramic material in the embodiment of FIG. 5, a part of the tube may also be made of glass. Furthermore, the metallic anode tube section 17 may be replaced by a glass tube and a metallic lead wire. Moreover, a modification of the laser tube structure such that each Brewster window 21 is replaced by a mirror of the inner mirror laser type is well conceivable within the scope of this invention. In designing the hollow-cathode laser tube structure according to this invention, it will be apparent also that the number of the cathode-anode assembly sections may be increased arbitrarily so as to obtain a desired laser oscillation output.

Thus, although the invention has been herein specifically described with respect to one embodiment, it will be apparent that modifications may be made therein without departing from the spirit and scope of the invention. What is claimed is:

1. A hollow-cathode metal vapor laser tube comprising a hollow cathode including a plurality of tubular cathode members aligned along a common central axis and axially spaced from one another by a predetermined interval, an anode including a plurality of tubular anode members interposed between adjacent ones of said cathode members and surrounding said cathode members with their axes aligned with said common axis, and means for electrically insulating each of said cathode member—anode member combinations from the neighboring cathode member—anode member combinations, thereby to permit the separate application of excitation power thereto.

2. The laser tube as claimed in claim 1, wherein each of said cathode member — anode member combinations comprises a flange-like insulator member having an apertured disc portion and a cylindrical portion perpendicularly extending from a circular aperture of said disc portion.

3. The laser tube as claimed in claim 2, wherein the inner diameter of said cylindrical portion is substantially equal to the outer diameter of said cathode member so as to permit said cathode member to be hermetically sealed thereto and to be held coaxially therewith, said anode member being hermetically sealed to the peripheral region of said disc portion of said insulator means with its axis aligned with said cathode member, wherein said cathode member — anode member combinations are stacked with their axes aligned with each other, said cathode members within said cylindrical portions being spaced mutually axially apart by said predetermined spacing.

4. The laser tube as claimed in claim 3, further comprising external excitation power supply means separately connected to said cathode members and anode members.

* * * * *